US008917873B2

(12) United States Patent
Kim

(10) Patent No.: US 8,917,873 B2
(45) Date of Patent: Dec. 23, 2014

(54) METHOD AND APPARATUS FOR REDUCING TDMA NOISE IN MOBILE COMMUNICATION TERMINAL

(75) Inventor: Gi-Bae Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 337 days.

(21) Appl. No.: 13/399,746

(22) Filed: Feb. 17, 2012

(65) Prior Publication Data

US 2012/0308013 A1 Dec. 6, 2012

(30) Foreign Application Priority Data

Jun. 1, 2011 (KR) ........................ 10-2011-0052805

(51) Int. Cl.
*H04H 20/47* (2008.01)
*H04B 15/04* (2006.01)
*H04B 1/10* (2006.01)

(52) U.S. Cl.
CPC .......... *H04B 15/04* (2013.01); *H04B 2215/061* (2013.01); *H04B 1/1027* (2013.01)
USPC ................................................. 381/2; 381/59

(58) Field of Classification Search
USPC ......................................................... 381/2, 59
See application file for complete search history.

(56) References Cited

U.S. PATENT DOCUMENTS 5,692,042 A * 11/1997 Sacca ....................... 379/390.01
8,218,460 B2 * 7/2012 Laaksonen et al. ........... 370/265

* cited by examiner

*Primary Examiner* — Simon Sing

(57) ABSTRACT

A mobile terminal includes an apparatus for reducing Time Division Multiple Access (TDMA) noise in the mobile communication terminal. The apparatus includes a first output path including a resistance element; a second output path not including a resistance element; a modem for, when detecting an event for outputting an audio signal, determining an output path of the audio signal and outputting a control signal indicating the determined output path; and a switch for switching according to the control signal and providing the audio signal to either the first output path or the second output path.

20 Claims, 3 Drawing Sheets

METHOD AND APPARATUS FOR REDUCING TDMA NOISE IN MOBILE COMMUNICATION TERMINAL

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jun. 1, 2011, and assigned Serial No. 10-2011-0052805, the entire disclosure of which is hereby incorporated by reference.

TECHNICAL FIELD OF THE INVENTION

The present invention relates generally to a mobile communication terminal. More particularly, the present invention relates to a method and an apparatus for reducing Time Division Multiple Access (TDMA) noise.

BACKGROUND OF THE INVENTION

A mobile communication terminal based on Time Division Multiple Access (TDMA) transmits and receives signals to and from a base station by separating a signal transmission interval and a signal reception interval based on a time axis. The mobile communication terminal based on the TDMA suffers from TDMA noise because of power consumption difference between the signal transmission interval and the signal reception interval. That is, the mobile communication terminal consumes more power in the signal transmission interval than the signal reception interval. As a result, the mobile communication terminal is subject to constant frequency noise in accordance with the signal transmission and reception period; that is, the TDMA noise.

Since the TDMA noise deteriorates the communication quality, various conventional methods improve the communication quality by suppressing the TDMA noise. For example, a conventional mobile communication terminal removes the TDMA noise by adding a resistance element to an output path of an audio signal and thus enhances the communication quality. However, the communication quality can be enhanced by adding the resistance element to the output path of the audio signal, whereas a sound volume is decreased. In other situations besides the communication, for example, when an MP3 audio signal is output, Total Harmonic Distortion (THD) increases disadvantageously.

SUMMARY OF THE INVENTION

To address the above-discussed deficiencies of the prior art, it is a primary aspect of the present invention to provide a method and an apparatus for reducing Time Division Multiple Access (TDMA) noise in a mobile communication terminal.

Another aspect of the present invention is to provide a method and an apparatus for dividing an audio signal output path into an output path including a resistance element and an output path not including a resistance element and determining the output path of an audio signal through switching in a mobile communication terminal.

Yet another aspect of the present invention is to provide a method and an apparatus for dividing an audio signal output path into an output path including a resistance element and an output path not including a resistance element and outputting an audio signal in the output path including the resistance element in case of weak electric field during communication of a mobile communication terminal.

According to one aspect of the present invention, an apparatus for reducing TDMA noise in a mobile communication terminal includes a first output path including a resistance element; a second output path not including a resistance element; a modem for, when detecting an event for outputting an audio signal, determining an output path of the audio signal and outputting a control signal indicating the determined output path; and a switch for switching according to the control signal and providing the audio signal to either the first output path or the second output path. The first output path and the second output path are signal paths interconnecting the switch and an audio signal output device.

According to another aspect of the present invention, a method for reducing TDMA noise in a mobile communication terminal includes detecting an event for outputting an audio signal; determining an output path of the audio signal as either a first output path including a resistance element or a second output path not including a resistance element; and switching according to the determined output path and outputting the audio signal to the determined output path. The first output path and the second output path are signal paths interconnecting a switch and an audio signal output device.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
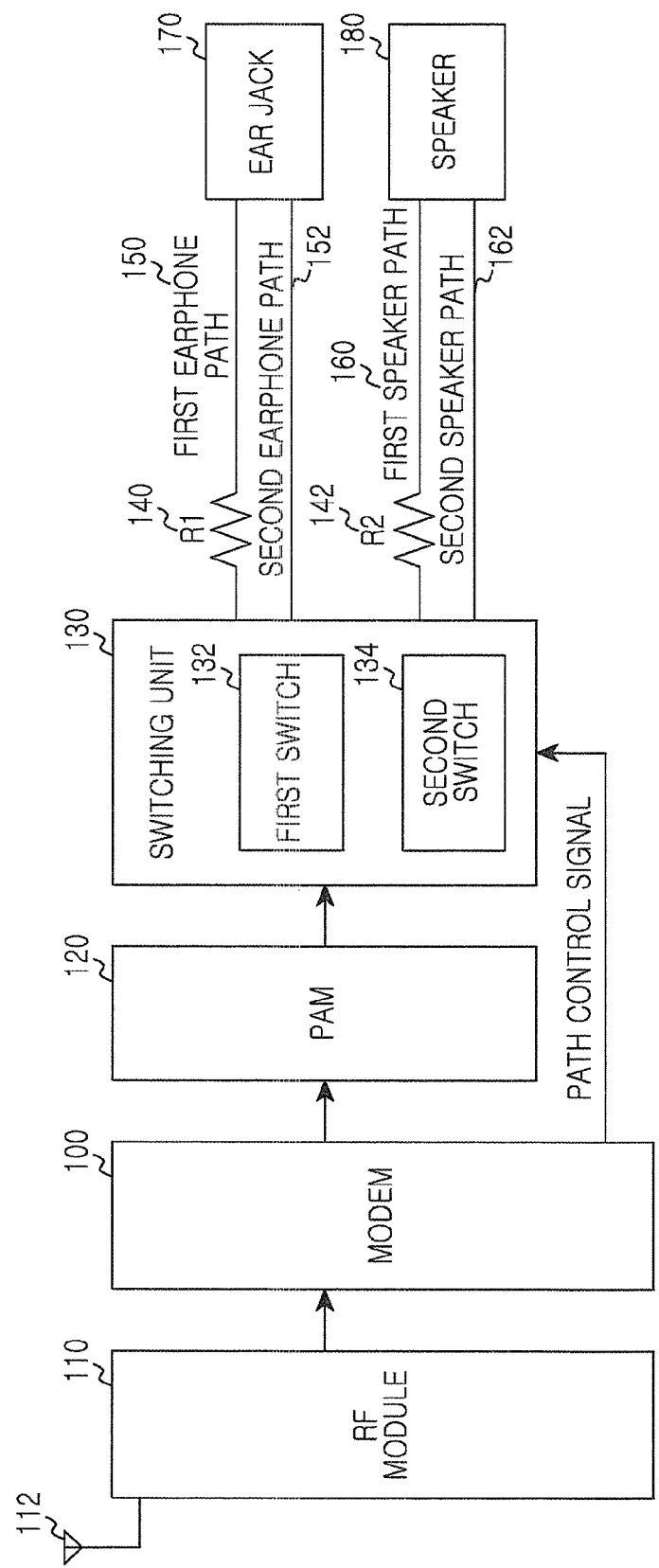
FIG. 1 illustrates a mobile communication terminal according to an exemplary embodiment of the present invention.
Figure 2:
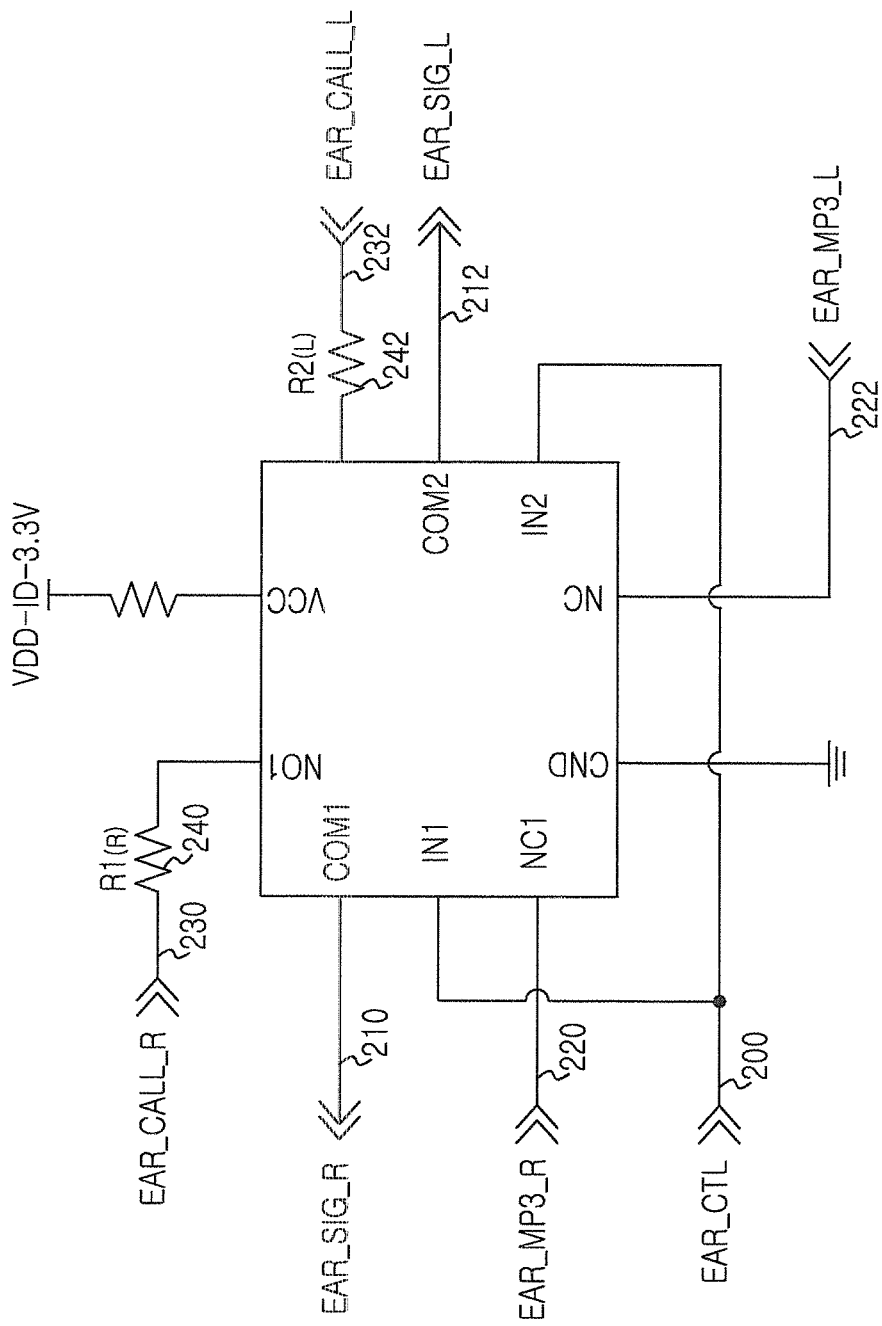
FIG. 2 illustrates a switch in the mobile communication terminal according, to an exemplary embodiment of the present invention.
Figure 3:
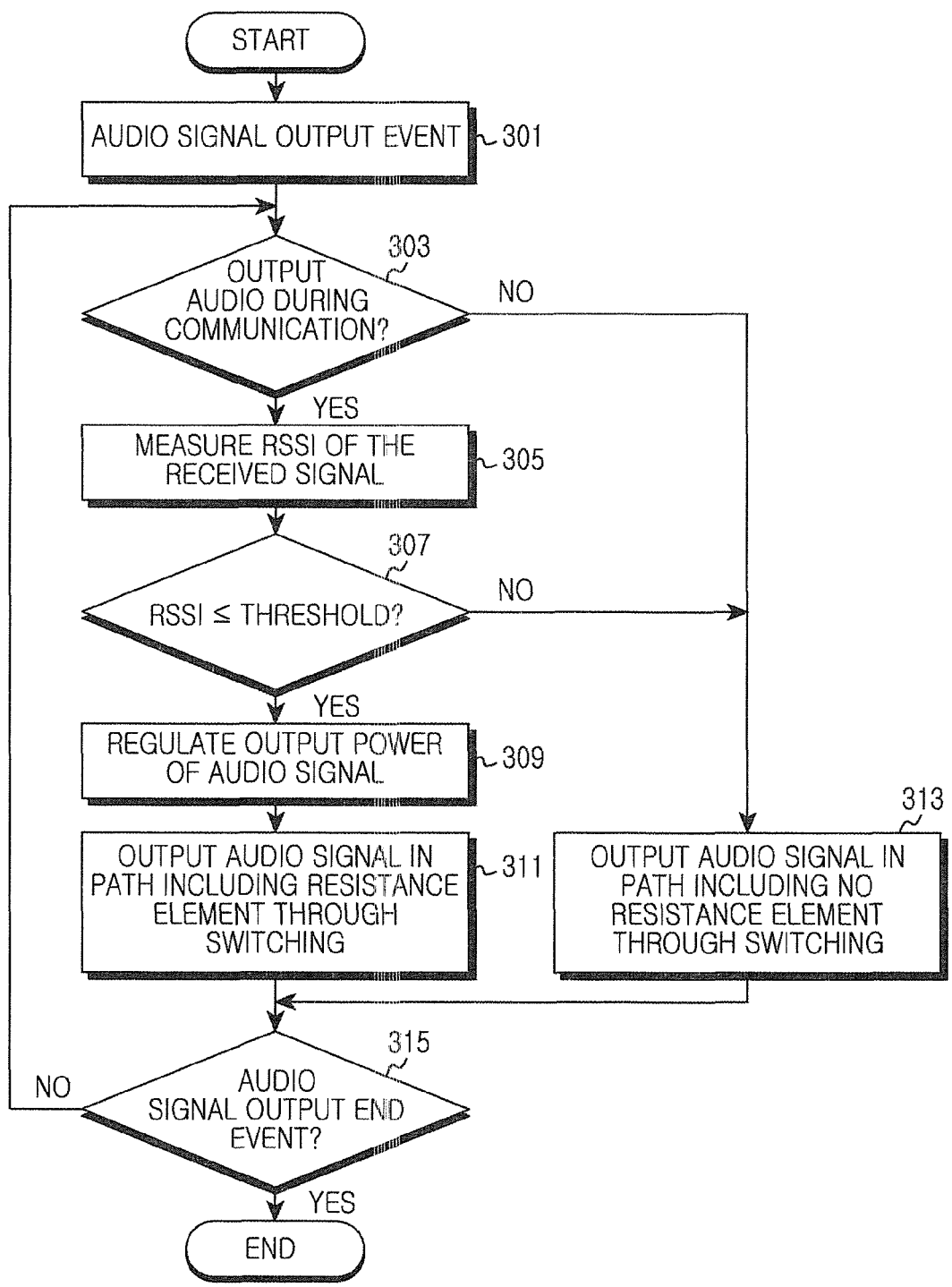
FIG. 3 illustrates operations of the mobile communication terminal according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for dividing an audio signal output path into an output path including a resistance element and an output path not including a resistance element and determining the output path of an audio signal through switching in a mobile communication terminal. Hereinafter, the mobile communication terminal represents a terminal supporting a Time Division Multiple Access (TDMA) communication scheme.

FIG. 1 illustrates a mobile communication terminal according to an exemplary embodiment of the present invention.

Referring to FIG. 1, the mobile communication terminal includes a modem 100, a Radio Frequency (RF) module 110, an antenna 112, a Power Amplifier Module (PAM) 120, a switching unit 130, an ear jack 170, and a speaker 180. The switching unit 130 includes a first switch 132 and a second switch 134. The first witch 132 of the switching unit 130 and the ear jack 170 are connected to a first earphone path 150 including a resistance element R1 140 and a second earphone path 152 not including a resistance element. The second switch 134 of the switching unit 130 and the speaker 180 are connected to a first speaker path 160 including a resistance element R2 142 and a second speaker path 162 not including a resistance element.

The modem 100 detects an audio signal output event. When the audio signal output event takes place, the modem 100 determines whether the audio signal output event is to output an audio signal during the communication or to output an audio signal according to execution of other service function (e.g., video or music file play) than the communication.

When the audio signal output event occurs during the communication, the modem 100 controls the RF module 110 to connect a call, converts a digital audio signal fed from the RF module 110 to an analog audio signal, and outputs the converted audio signal to the PAM 120. The modem 100 determines weak electric field or strong electric field by measuring a receive strength of the signal input through the RF module 110, determines the output path of the audio signal according to the result of the determination, and then outputs to the switching unit 130 a signal for controlling the output path of the audio signal. More particularly, the modem 100 compares the receive signal strength and a threshold, determines the strong electric field when the receive signal strength is greater than the threshold, and determines the weak electric field when the receive signal strength is smaller than or equal to the threshold. Next, in the strong electric field, the modem 100 outputs to the switching unit 130 the control signal instructing to output the audio signal in the output path not including the resistance element. In the weak electric field, the modem 100 outputs to the switching unit 130 the control signal instructing to output the audio signal in the output path including the resistance element. Herein, in the weak electric field, the audio signal is output in the path including the resistance element and its volume or sound quality can be decreased. Hence, the modem 100 can compensate for the volume and the sound quality of the audio signal in the weak electric field. For example, the modem 100 can compensate for the output volume of the audio signal by increasing a gain of the PAM 120 over a preset gain.

When the audio signal output event occurs according to the execution of the other service function than the communication, the modem 100 converts the digital audio signal fed from a storage (not shown) to an analog audio signal, and outputs the converted audio signal to the PAM 120. The modem 100 outputs to the switching unit 130 the control signal instructing to output the audio signal in the output path not including the resistance element.

The modem 100 determines either the ear jack 170 or the speaker 180 as the output device, and informs the PAM 120 of the determined output device. Herein, the modem 100 can determine the output device of the audio signal using conventional methods. For example, when an earphone is connected to the ear jack 170, the modem 100 can determine the ear jack 170 as the output device of the audio signal. When the earphone is not connected to the ear jack 170, the modem 100 can determine the speaker 180 as the output device of the audio signal.

The RF module 110 RF-processes the signal output from the modem 100, transmits the RF signal over the antenna 112, processes an RF signal received over the antenna 112 to a baseband signal, and provides the baseband signal to the modem 100.

The PAM 120 amplifies the signal fed from the modem 100 at a preset level and outputs the amplified signal to the switching unit 130. The PAM 120 can amplify the audio signal for the ear jack output and the audio signal for the speaker output at different levels. That is, when the audio signal for the ear jack output is input from the modem 100, the PAM 120 amplifies or bypasses the input audio signal at a preset low level and provides the signal to the first switch 132 of the switching unit 130. When the audio signal for the speaker output is input from the modem 100, the PAM 120 amplifies the input audio signal at a preset high level and provides the signal to the second switch 134 of the switching unit 130.

The switching unit 130 switches the signal according to the path control signal output from the modem 100 and provides the audio signal fed from the PAM 120 to the path including the resistance element or the path not including the resistance element.

The switching unit 130 including the first switch 132 and the second switch 134 can receive the audio signal to output to the ear jack 170 from the PAM 120 via the first switch 132 and the audio signal to output to the speaker 180 from the PAM 120 via the second switch 134. That is, when receiving the audio signal for the ear jack output from the PAM 120, the first switch 132 switches the signal according to the path control signal fed from the modem 100 and outputs the audio signal in the first earphone path 150 including the resistance element R1 140 or in the second earphone path 152 not including the resistance element. When receiving the audio signal for the speaker output from the PAM 120, the second switch 134 switches the signal according to the path control signal fed from the modem 100 and outputs the audio signal in the first speaker path 160 including the resistance element R2 142 or in the second speaker path 162 not including the resistance element. Herein, the resistance element R1 140 and the resistance element R2 142 remove TDMA noise of the signal passing through the corresponding path.

The ear jack 170 receives the audio signal in either the first earphone path 150 or the second earphone path 152 according to the switching operation of the first switch 132, and outputs the received audio signal to an earphone (not shown) connected.

The speaker 180 receives the audio signal in either the first speaker path 160 or the second speaker path 162 according to the switching operation of the second switch 134, and outputs the received audio signal to the outside.

In FIG. 1, to ease the understanding, the first earphone path 150 and the second earphone path 152 interconnecting the first switch 132 and the ear jack 170, and the first speaker path 160 and the second speaker path 162 interconnecting the second switch 134 and the speaker 180 are illustrated as the single path respectively. Yet, the paths 150, 152, 160 and 162 can include a left signal path and a right signal path similar to a general audio output path.

For example, the connecting path between the first switch 132 and the ear jack 170 can include a right path including the resistance element, a left path including the resistance element, a right path not including the resistance element, and a left path not including the resistance element. Based on this structure, the operations of the first switch 132 are explained by referring to FIG. 2. Note that the switching operation in FIG. 2 is equally applicable to the second switch 134.

FIG. 2 illustrates the switch in the mobile communication terminal according to an exemplary embodiment of the present invention.

Referring to FIG. 2, the switch receives the right audio signal through EAR_SIG_R 210, the left audio signal through EAR_SIG_L 212, and the path control signal indicating the output path of the audio signal through EAR_CTL 200. According to the path control signal input through the EAR_CTL 200, the switch outputs the audio signals fed from the EAR_SIG_R 210 and the EAR_SIG_L 212 to EAR_CALL_R 230 including the resistance element $R1_{(R)}$ 240 and EAR_CALL_L 232 including the resistance element $R1_{(L)}$ 242, or to EAR_MP3_R 220 and EAR_MP3_L 222 not including the resistance element.

For example, it is assumed that the modem 100 outputs a high signal in the weak electric field and outputs a low signal in other situations during the communication. When the high signal is input through the EAR_CTL 200, the switch outputs the audio signals fed from the EAR_SIG_R 210 and the EAR_SIG_L 212 to the EAR_CALL_R 230 including the resistance element $R1_{(R)}$ 240 and the EAR_CALL_L 232 including the resistance element $R1_{(L)}$ 242. By contrast, when the low signal is input through the EAR_CTL 200, the switch outputs the audio signals fed from the EAR_SIG_R 210 and the EAR_SIG_L 212 to the EAR_MP3_R 220 and the EAR_MP3_L 222 not including the resistance element.

So far, while the ear jack path and the speaker path for outputting the audio signal include the path with the resistance element and the path without the resistance element in the mobile communication terminal, only one of the ear jack path and the speaker path can include the path with the resistance element and the path without the resistance element according to the design.

While it is assumed that the PAM 120 is interposed between the modem 100 and the switching unit 130, the PAM may be omitted according to the design.

FIG. 3 illustrates operations of the mobile communication terminal according to an exemplary embodiment of the present invention.

Referring to FIG. 3, the mobile communication terminal detects the audio signal output event in step 301, and determines whether the audio signal output event is to output the audio signal during the communication in step 303.

When the audio signal output event is to output the audio signal according to the execution of other service function (e.g., video or music file play) than the communication, the mobile communication terminal outputs the audio signal in the path not including the resistance element through the switching in step 313 and goes to step 315. That is, the mobile communication terminal determines that it is unnecessary to remove the TDMA noise when the call is not connected, and outputs the audio signal in the path not including the resistance element.

Alternatively, when the audio signal output event is to output the audio signal during the communication, the mobile communication terminal measures the Received Signal Strength Indication (RSSI) indicating the strength of the received signal in step 305. In step 307, the mobile communication terminal compares the measured RSSI and a preset threshold and determines whether the RSSI is smaller than or equal to the threshold.

When the RSSI is greater than the threshold, the mobile communication terminal determines the strong electric field, outputs the audio signal in the path not including the resistance element through the switching in step 313, and then goes to step 315. That is, in the strong electric field, the mobile communication terminal determines that it is unnecessary to remove the TDMA noise, and outputs the audio signal in the path not including the resistance element.

Alternatively, when the RSSI is smaller than or equal to the threshold, the mobile communication terminal determines the weak electric field and regulates the output power of the audio signal in step 309. For example, the mobile communication terminal can regulate the gain of the PAM which amplifies the audio signal, in a predefined manner. Next, the mobile communication terminal outputs the audio signal to the path including the resistance element through the switching in step 311 and proceeds to step 315. That is, in the weak electric field, the mobile communication terminal takes into account the strong TDMA noise and outputs the audio signal in the path including the resistance noise to remove the TDMA noise. When the TDMA is removed by the resistance element, the volume of the audio signal can be lost. To compensate for the loss, the mobile communication terminal regulates the output power of the audio signal before outputting the audio signal in the path including the resistance element in step 309.

In step 315, the mobile communication terminal determines whether an audio signal output end event takes place. For example, the mobile communication terminal determines whether the call is terminated when the audio signal is output during the communication, or the music file play is terminated during the music file play.

When the audio signal output end event does not occur, the mobile communication terminal returns to step 303. When the audio signal output end event occurs, the mobile communication terminal finishes this process.

As set forth above, the mobile communication terminal divides the audio signal output path into the first output path including the resistance element and the second output path not including the resistance element, outputs the audio signal in the first output path in case of the weak electric field during the communication, and outputs the audio signal in the second output path in other situations. Therefore, it is possible to block the TDMA noise from distorting the audio signal in the weak electric field which generates the strong TDMA noise, to prevent the output volume of the audio signal from decreasing in the strong electric field which scarcely yields the TDMA noise, and to reduce Total Harmonic Distortion (THD) when the audio signal is output in other situations than the communication.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for reducing Time Division Multiple Access (TDMA) noise in a mobile communication terminal, the apparatus comprising:
    a first output path comprising a resistance element;
    a second output path not comprising a resistance element;
    a modem configured to, when detecting an event for outputting an audio signal, determine an output path of the audio signal based on whether or not the mobile communication terminal is communicating and output a control signal indicating the determined output path; and
    a switch configured to switch according to the control signal and provide the audio signal to either the first output path or the second output path,
    wherein the first output path and the second output path are signal paths interconnecting the switch and an audio signal output device.

2. The apparatus of claim 1, wherein, when the mobile communication terminal is not communicating, the modem is configured to determine the second output path as the output path of the audio signal.

3. The apparatus of claim 2, wherein, when the receive signal strength is smaller than or equal to the preset threshold while the mobile communication terminal communicates, the modem is configured to regulate an output volume of the audio signal.

4. The apparatus of claim 1, wherein, when the mobile communication terminal is communicating, the modem is configured to determine the output path of the audio signal according to a receive signal strength.

5. The apparatus of claim 4, wherein, when the receive signal strength is smaller than or equal to a preset threshold while the mobile communication terminal communicates, the modem is configured to determine the first output path as the output path of the audio signal.

6. The apparatus of claim 4, wherein, when the receive signal strength is greater than the preset threshold while the mobile communication terminal communicates, the modem is configured to determine the second output path as the output path of the audio signal.

7. The apparatus of claim 1, further comprising:
    a power amplifier module configured to amplify the audio signal output from the modem and output the amplified audio signal to the switch.

8. The apparatus of claim 1, wherein the audio signal output device is one of: an ear jack and a speaker, and
    wherein the first output path and the second output path are configured to output the signal output from the switch to the same audio signal output device.

9. The apparatus of claim 1, wherein the mobile communication terminal is configured to output the audio signal via one of the first output path and the second output path.

10. A method for reducing Time Division Multiple Access (TDMA) noise in a mobile communication terminal, the method comprising:
    detecting an event for outputting an audio signal;
    determining an output path of the audio signal as either a first output path comprising a resistance element or a second output path not comprising a resistance element based on whether or not the mobile communication terminal is communicating; and
    switching according to the determined output path and outputting the audio signal to the determined output path,
    wherein the first output path and the second output path are signal paths interconnecting a switch and an audio signal output device.

11. The method of claim 10, wherein, when the mobile communication terminal is not communicating, the second output path is determined as the output path of the audio signal.

12. The method of claim 11, further comprising:
    when the receive signal strength is smaller than or equal to the preset threshold while the mobile communication terminal communicates, regulating an output volume of the audio signal.

13. The method of claim 10, wherein, when the mobile communication terminal is communicating, the output path of the audio signal is determined according to a receive signal strength.

14. The method of claim 13, wherein, when the receive signal strength is smaller than or equal to a preset threshold while the mobile communication terminal communicates, the first output path is determined as the output path of the audio signal.

15. The method of claim 13, wherein, when the receive signal strength is greater than the preset threshold while the mobile communication terminal communicates, the second output path is determined as the output path of the audio signal.

16. The method of claim 10, further comprising:
    amplifying and outputting the audio signal.

17. The method of claim 10, wherein the audio signal output device is either an ear jack or a speaker, and outputting, by one of the first output path and the second output path, the audio signal to the same audio signal output device.

18. The method of claim 10, further comprising outputting the audio signal via one of the first output path and the second output path.

19. A mobile terminal configured to reduce Time Division Multiple Access (TDMA) noise, the mobile terminal comprising:
- a first output path comprising a resistance element;
- a second output path not comprising a resistance element;
- a modem configured to, when detecting an event for outputting an audio signal, determine an output path of the audio signal based on whether or not the mobile terminal is communicating and output a control signal indicating the determined output path; and
- a switch configured to switch according to the control signal and provide the audio signal to either the first output path or the second output path,
- wherein the first output path and the second output path are signal paths interconnecting the switch and an audio signal output device.

20. The mobile terminal of claim 19, wherein the mobile terminal is configured to output the audio signal via one of the first output path and the second output path.

\* \* \* \* \*